United States Patent
Martens (10) Patent No.: US 10,145,485 B2
(45) Date of Patent: Dec. 4, 2018

(54) COMPRESSOR DEVICE AND METHOD FOR CONTROLLING SUCH A COMPRESSOR DEVICE

(71) Applicant: ATLAS COPCO AIRPOWER, NAAMLOZE VENNOOTSCHAP, Wilrijk (BE)

(72) Inventor: Kristof Adrien Laura Martens, Grimbergen (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 325 days.

(21) Appl. No.: 14/380,876

(22) PCT Filed: Feb. 22, 2013

(86) PCT No.: PCT/BE2013/000009
§ 371 (c)(1),
(2) Date: Aug. 25, 2014

(87) PCT Pub. No.: WO2013/126971
PCT Pub. Date: Sep. 6, 2013

(65) Prior Publication Data
US 2015/0030468 A1    Jan. 29, 2015

(30) Foreign Application Priority Data
Feb. 29, 2012 (BE) .................... 2012/0132

(51) Int. Cl.
*F04B 39/06* (2006.01)
*F16K 31/00* (2006.01)
(Continued)

(52) U.S. Cl.
CPC ........ *F16K 31/002* (2013.01); *F04B 39/0207* (2013.01); *F04B 39/06* (2013.01);
(Continued)

(58) Field of Classification Search
CPC .... F04B 39/062; F04B 39/06; F04B 39/0207; F04B 49/06; F04B 2207/03; F04C 29/042;
(Continued)

(56) References Cited

U.S. PATENT DOCUMENTS 783,601 A * 2/1905 Waters ................. F24H 1/0045
122/250 R
4,616,484 A * 10/1986 Mehdi ................ B60H 1/00007
62/180
(Continued)

FOREIGN PATENT DOCUMENTS

BE    1016814 A3    7/2007
BE    1018075 A3    4/2010
(Continued)

OTHER PUBLICATIONS

International Search Report (ISR) dated Sep. 23, 2013, for PCT/BE2013/000009.
Korean Office Action dated Jul. 1, 2016, for KR 10-2014-7023451.

*Primary Examiner* — Peter J Bertheaud
*Assistant Examiner* — Dnyanesh Kasture
(74) *Attorney, Agent, or Firm* — Bacon & Thomas, PLLC (57) ABSTRACT

Compressor device that comprises a compressor element that is equipped with a compression chamber with at least one coolant inlet, and which furthermore comprises a gas outlet, a gas/coolant separation tank connected to it, and, a cooling circuit with a cooler that extends between the separation tank and the coolant inlet, and which is equipped with control means to adjust the temperature of the coolant flow supplied to the compressor element, whereby the aforementioned control means comprise a first and a second sub-controller, each with a different target parameter, whereby the control means also comprise switching means
(Continued)

to place one of the two sub-controllers in an activated state and the other sub-controller in a deactivated state.

25 Claims, 7 Drawing Sheets

(51) Int. Cl.
F04B 39/02 (2006.01)
F04B 49/06 (2006.01)
F04C 29/04 (2006.01)
F04C 29/02 (2006.01)

(52) U.S. Cl.
CPC ............ *F04B 39/062* (2013.01); *F04B 49/06* (2013.01); *F04C 29/042* (2013.01); *F04B 2207/03* (2013.01); *F04C 29/021* (2013.01); *F04C 29/026* (2013.01); *F04C 2270/195* (2013.01); *Y10T 137/6579* (2015.04); *Y10T 137/7737* (2015.04)

(58) Field of Classification Search
CPC .................. F04C 29/026; F04C 29/021; F04C 2270/195; Y10T 137/6579; Y10T 137/7737; F16K 31/002
See application file for complete search history.

(56) References Cited

U.S. PATENT DOCUMENTS

| | | | | |
|---|---|---|---|---|
| 6,575,707 B2* | 6/2003 | Matt | ........................ | F04B 41/00 165/297 |
| 2003/0082065 A1* | 5/2003 | Foerster | ............... | F04C 29/0014 418/84 |
| 2003/0086793 A1 | 5/2003 | Matt et al. | | |
| 2005/0103041 A1* | 5/2005 | Krempel | ................ | G05D 23/08 62/383 |
| 2006/0060345 A1* | 3/2006 | Flik | ............ | F01P 3/20 165/297 |
| 2009/0027162 A1* | 1/2009 | Forster | ............... | G06K 19/0717 340/10.1 |
| 2010/0206543 A1* | 8/2010 | Tylisz | ................... | F01M 5/007 165/297 |
| 2011/0061744 A1* | 3/2011 | Zillig | .................... | F15B 21/042 137/15.01 |
| 2012/0132413 A1* | 5/2012 | Cheadle | ................... | F01M 5/00 165/297 |
| 2012/0211216 A1* | 8/2012 | Noonchester | .......... | F01M 5/021 165/271 |

FOREIGN PATENT DOCUMENTS

| | | |
|---|---|---|
| EP | 1156213 A1 | 11/2001 |
| GB | 2254660 A | 10/1992 |
| JP | H08-004679 A | 1/1996 |
| JP | 2002-276552 A | 9/2002 |
| WO | 94/21921 A1 | 9/1994 |
| WO | 2011/090482 A2 | 7/2011 |

* cited by examiner

COMPRESSOR DEVICE AND METHOD FOR CONTROLLING SUCH A COMPRESSOR DEVICE

BACKGROUND OF THE INVENTION

The present invention relates to a compressor device and a method for controlling a compressor device.

More specifically the invention relates to a compressor device with liquid cooling whereby coolant is injected into the compression chamber.

Compressor devices are used for compressing a gas or a mixture of gases such as air. Compressed air can be used for example in a consumer network located downstream from the compressor device, such as for driving pneumatic tools, as a propellant in pneumatic transports or similar.

For many applications it is not desirable for coolant to still be present in the compressed gas when this gas is injected into the consumer network. Hence a gas/coolant separator is generally provided to remove coolant from this compressed gas. This separator generally takes on the form of a tank in which the coolant is centrifugally separated from the compressed gas.

The coolant separated from the compressed gas is generally used again for injection into the compressor element, preferably after having been cooled. With a screw compressor for example, the coolant is used for lubricating and/or sealing the rotors of the compressor element.

The cooling of the compressor element is generally realised on the basis of a cooling circuit that normally comprises a liquid pipe that extends between the separation tank and the compressor element, and this liquid pipe is provided with a cooler. Furthermore, such a cooling circuit often comprises a bypass across the cooler and control means, for example a valve, with which the ratio between the respective coolant flows through the cooler and bypass can be varied. To this end the actual level of cooling of the coolant can be varied and thus the coolant temperature is adjusted to a desired value.

The control of the cooling of the compressor element can be done alternatively by acting on a secondary cooling circuit, for example by making a fan rotate faster or slower (the medium in the secondary cooling circuit is then air) or by controlling the flow or temperature of the medium in the secondary cooling circuit.

The flow of coolant in the cooling circuit is normally determined by the pressure in the coolant pipe at its connection to the injection point or injection points of this coolant into the compressor element, and which injection points are generally provided at the inlet or just after the inlet in the compression process of the compressor element. However, it is also possible for a pump to be provided that propels the coolant (for example, but not limited to, oil), which together with the geometry of the coolant-injection opening(s) in the compressor element determines the coolant flow rate.

If the compressor element is used to compress air as the gas to be compressed, this gas generally contains water vapour. Depending on the temperature and pressure at a certain place in the compressor device, this water vapour can condense into liquid water at that place.

An important precondition for the optimum use of a compressor device is that the temperature in the tank must always be such that it is above the dew point of the compressed gas present in it, and this to prevent condensate formed there mixing with the coolant, as this negatively affects the cooling capacity of the coolant, can lead to damage of components of the compressor device, and is also harmful to the lubricating properties.

This precondition is realised in practice by adjusting the bypass across the cooler and/or the flow of coolant supplied to the compressor element, thus acting on the primary cooling circuit. The realisation of the precondition by acting on the secondary cooling circuit is applied less in practice, in view of the high cost (adjustment of fan speed, adjustment of secondary coolant flow rate) and negative impact on the reliability of the compressor installation in general (temperature-sensitive components, large number of switching cycles) and the cooler in particular (reduction of the flow in the secondary cooling circuit can lead to too high temperatures in this cooling circuit, which in turn can harm or damage the cooler).

Thus in practice the temperature in the gas/coolant tank is often set to a fixed temperature which—possibly with a certain margin—is above the maximum possible condensation temperature, which in turn is a function of the maximum allowed temperature of the gas to be compressed, of the humidity of the gas to be compressed, and of the maximum allowed operating pressure in the gas/coolant tank.

However, this maximum possible condensation temperature only occurs if the previous three parameters have their maximum allowed value at the same time, which only occurs sporadically during the period of operation of an average installation. This means that for the majority of the period of operation of the compressor installation, the temperature of the gas/coolant tank is set at too high a value in order to prevent condensation in the operating conditions that occur.

The operating conditions can thus be optimised by keeping the temperature of the compressed gas leaving the compressor element, and the practically same temperature in the gas/coolant separation tank, lower. Indeed, if oil is used as a coolant for example, through thermal degradation this oil loses its lubricating properties and these same higher temperatures lead to a general reduction of the lifetime of the oil, such that the oil will have to be changed more quickly to prevent operation with an oil that is too highly degraded and thereby harming the compressor device.

Moreover for each compressor installation there is a known injection temperature of the coolant in the compressor element, whereby the efficiency of the compressor installation is optimum.

Injection temperatures both above and below this known injection temperature lead to a higher energy consumption of the compressor installation.

This known injection temperature—after being increased by the heating in the compressor element, which is a function of the coolant flow rate and the power of the compressor element, with this last-mentioned in turn being a function of the supplied compressed gas flow rate, the pressure of the compressed gas flow and the efficiency of the compression process—corresponds to a certain temperature in the gas/coolant separation tank, which is generally somewhat lower than the temperature that must be set if account is taken of the maximum possible condensation temperature.

The temperature of the outgoing gas thus has to be above the condensation temperature, but is preferably not too high either, in view of the logical aim for a long coolant lifetime and low energy consumption.

A number of methods are already known for controlling the temperature of the gas supplied by a compressor element. On the one hand there are electronic-based control systems that measure parameters, and on the basis of them endeavour to control the temperature and/or flow rate of the coolant supplied to the compressor element, or the temperature and/or the flow rate of the medium in the secondary circuit of the cooler, via controlled valves, or by means of a controller of a pump or fan speed. Such systems are described in WO 94/21921, BE 1.016.814 and EP 1.156.213 for example.

Such systems can be relatively expensive because they comprise a multitude of valves, electronic controllers and measuring sensors. Such known systems also comprise temperature-sensitive electronic components. These known systems generally also require a large number of switching cycles whereby the complexity, and thus the cost, increases and the reliability decreases.

There are also cooling systems on the market that are equipped with a thermostatic element for controlling the ratio between the coolant flows through the cooler and through the bypass. These cooling systems are indeed cheap and robust, but have the limitation that the temperature they are controlled at is fixed.

In cooling systems with thermostatic elements, traditionally only one of two target parameters are set to a reference value, as explained hereinafter.

On the one hand, the maximum condensation temperature is determined (i.e. the maximum temperature at which condensation can still occur in the tank) on the basis of the design values of the compressor device, via a 'worst-case' calculation. This maximum condensation temperature is reached when the maximum design operating pressure is supplied at a maximum design temperature and humidity of the intake gas.

The thermostatic control then operates with the temperature of the compressor element outlet as a target parameter, or the practically same temperatures of the coolant in the separation tank or at the cooler inlet, and ensures that, if this temperature is higher than the maximum condensation temperature, more coolant flows through the cooler, while in other circumstances more coolant flows through the bypass until the desired temperature is reached.

When the temperature of the coolant is approximately equal to the reference value, i.e. the calculated maximum condensation temperature, the control equilibrium is reached and the coolant will flow partly through the bypass and partly through the cooler, or completely through the cooler or completely through the bypass.

It goes without saying that when determining the maximum condensation temperature a safety margin can be taken into account, among others to compensate for any delays in the control system.

An advantage of this method is that in principle condensation is always prevented, but has the disadvantage that in a large proportion of the operating conditions, i.e. with a lower than maximum allowed humidity and/or temperature of the intake gas and/or lower than maximum allowed operating pressure of the compressor element, the outlet temperature of the compressor element is set to a much higher value than necessary, with the above-mentioned disadvantages.

On the other hand, the maximum condensation temperature determined in the above way can be converted back to a reference temperature of the coolant at the compressor element inlet, because the heat that the compressor element emits to the coolant, at maximum operating pressure and maximum speed—for a compressor with variable speed—is known.

As long as the temperature of the coolant at the inlet is higher than this reference temperature, in principle the compressor device is also protected against condensation.

This opens up the possibility to adjust the ratio of the coolant flows through the bypass and through the cooler on the basis of the mixed temperature of these two flows, which is practically equal to the temperature at the inlet of the compressor element.

This is done in such a way that the thermostatic control takes the mixed temperature of the coolant from the cooler and from the bypass as a reference temperature, and ensures that if this temperature is higher than the reference temperature, more coolant flows through the cooler, while in other conditions more coolant flows through the bypass until the desired temperature is reached again.

When the temperature of the coolant is approximately equal to the reference value, the control equilibrium is reached and the coolant will partly flow through the bypass and partly through the cooler, or completely through the cooler or completely through the bypass.

It goes without saying that when determining the reference temperature for the inlet temperature of the coolant, a safety margin can again be taken into consideration.

Because a compressor device often operates at a lower than maximum allowed pressure or speed—for speed-controlled compressors—in such a case the final temperature in the compressor element will be lower than at the maximum pressure and speed, such that an average lower temperature is reached in the compressor element, which has the above-mentioned advantages.

However, the disadvantage here is that condensation is not prevented with certainty. Indeed, operating conditions can occur in which condensation can occur.

SUMMARY OF THE INVENTION

The purpose of the present invention is to provide a solution to one or more of the aforementioned and/or other disadvantages, by providing a compressor device that comprises a liquid-injected compressor element that is equipped with a compression chamber with at least one coolant inlet, and which furthermore comprises a gas outlet, a gas/coolant separation tank connected to the gas outlet, and a cooling circuit equipped with a cooler that extends between the separation tank and the coolant inlet, and which is equipped with control means to adjust the temperature of the coolant flow supplied to the compressor element, whereby the aforementioned control means comprise a first and a second sub-controller, each with a different target parameter, whereby the aforementioned control means comprise switching means to place one of the two sub-controllers in an activated state and the other of the two sub-controllers in a deactivated state.

Advantages of such a compressor device are that they have more control flexibility and can operate in a more energy-efficient way.

Another advantage is that the coolant preserves its lubricating properties for longer because it is less exposed to high temperatures.

Another advantage is that it can be combined with preventing the presence of condensate in the coolant.

The compressor device preferably comprises a cooling circuit that connects to the coolant inlet and which comprises a cooler.

The aforementioned first sub-controller is preferably constructed in the form of a controller for the temperature of the coolant at the inlet of the cooler, or a temperature practically equal to it.

The aforementioned second sub-controller is preferably constructed in the form of a controller for the temperature of the coolant at the coolant inlet of the compressor element, or a temperature practically equal to it.

This has the advantage that it enables direct and simple control.

According to a practical embodiment, the first and second sub-controller each comprise a thermostatic shut-off valve, whereby these respective thermostatic shut-off valves preferably contain a common housing.

The aforementioned housing of the thermostatic shut-off valves preferably comprises an inlet channel and an outlet channel that are connected together by three connecting channels, the first and second of which can be shut off, whereby a first thermostatic shut-off valve with a first sensor element that is thermally connected to the inlet channel can reversibly shut off the first connecting channel when a reference value of the temperature in the inlet channel is exceeded, whereby a second thermostatic shut-off valve with a second sensor element that is thermally connected to the outlet channel can reversibly shut off the second connecting channel when a reference value of the temperature in the outlet channel is exceeded, and whereby the link formed by the third connecting channel runs via the cooler.

The geometry of the inlet channel and the outlet channel is such that the coolant always entirely or partially flows over the sensor elements of the two thermostatic shut-off valves, independently of the position of these thermostatic shut-off valves.

This has the advantage that the compressor device can be of a cheap, simple, compact, robust and reliable construction.

In a further preferred embodiment, the sensor element of each shut-off valve is affixed in a chamber with an opening, whereby the dimensions of the chamber of both shut-off valves are the same and whereby the switching means comprise a deactivating cap that has a length that corresponds to the position of the plunger, whereby the connecting channel is closed and is provided with a recess that enables the free expansion of the sensor element according to the temperature, and comprise an activating cap that has a length that is such that this activating cap forms a fixed end stop for the other sensor element, whereby this sensor element can entirely or partially close the connecting channel according to the temperature.

This has the advantage that due to the simple exchange of two caps, that can be marked with lettering, a symbol or colour, the first or second sub-controller can be quickly and easily activated, also by non-specially trained personnel, without modifications having to be made to the compressor device itself for this purpose, and this even without temporarily having to take the compressor installation out of service.

In order to determine which of the two sub-controllers have to be made active, use can be made of a decision table or diagram that indicates the optimum choice according to the temperature of the intake gas and operating pressure occurring at that time, or according to the expected maximum temperature of the intake gas and operating pressure up to the next switchover. The decision table or diagram may also be supplemented with the humidity of the intake gas as a third decision parameter. This decision table or diagram thus indicates when the thermostat that keeps the temperature in the gas/liquid separator above the condensation point must be switched on, or when the thermostat that controls the temperature of the coolant inlet of the compressor element can be switched on as a function of the temperature of the intake gas and operating pressure—possibly supplemented by the humidity of the intake gas.

This has the advantage that with a minimum number of simple manual switchovers, the compressor can be protected against the occurrence of condensate in the gas/coolant separation tank only when really necessary, and in other cases can operate without reducing the lifetime of the coolant or increasing the energy consumption of the compressor installation.

The invention also concerns a method for controlling a compressor device, comprising a liquid-injected compressor element equipped with a compression chamber with one or more coolant inlets in order to supply a cooling capacity to the compressor element, a gas/coolant separation tank connected to the outlet of the compressor element, and a pipe equipped with a cooler, for supplying a flow of coolant between the tank and the coolant inlet, whereby this method comprises a selection step in which one of two or more sub-controllers that exclude one another and which act on a fixed but different target parameter is activated on the basis of the expected or actual operating conditions in order to adjust the temperature of the coolant at the coolant inlet of the compressor element.

This has the advantage that a compressor device can be prepared for the expected operating circumstances.

BRIEF DESCRIPTION OF THE DRAWINGS

With the intention of better showing the characteristics of the invention, a few preferred embodiments of a compressor device according to the invention are described hereinafter, as well as a method for controlling a compressor device, by way of an example without any limiting nature, with reference to the accompanying drawings, wherein.

DETAILED DESCRIPTION OF THE INVENTION

Figure 1:
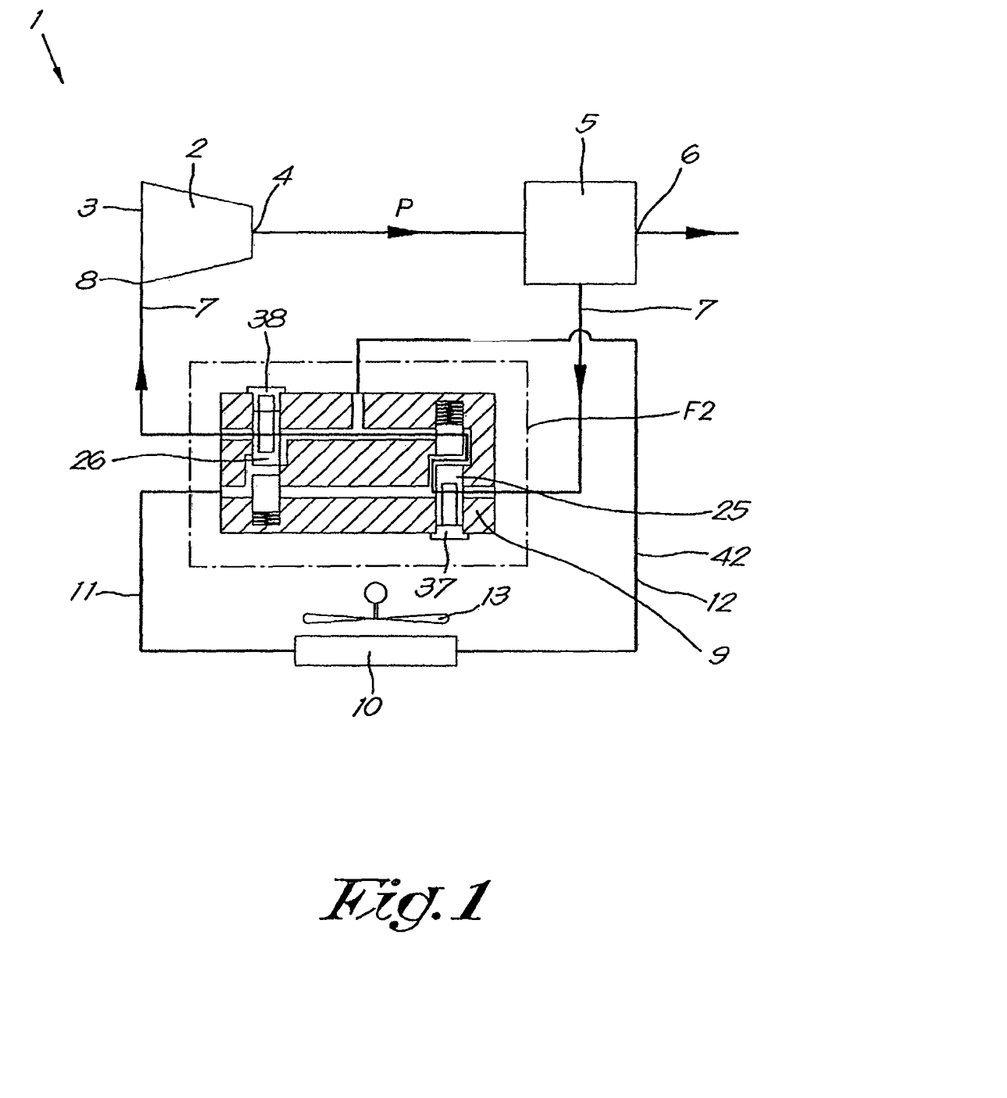
FIG. 1 schematically shows a compressor device according to the invention.

The compressor device 1 shown in FIG. 1 comprises a compressor element 2 with a gas inlet 3 and a gas outlet 4 that is connected to a gas/coolant separation tank 5, that is provided with a compressed gas tap-off point 6 for a user network located downstream.

The compressor device is further provided with a liquid pipe 7 between the aforementioned separation tank 5 and one or more coolant inlets 8 in the compressor element 2, which are constructed as an oil injector.

In this example the liquid pipe 7 is interrupted by a thermostat block 9, that is connected by two pipes to a cooler 10, i.e. through a cooling pipe 11 and a cooling return-pipe 12. The set formed by the cooling pipe 11, cooling return pipe 12, the part of the cooler 10 through which the coolant flows, and the thermostat block 9 is called the primary cooling circuit. In this example the cooler 10 is equipped with, a fan 13 that brings about the cooling. The fan, the cooling air supplied to the cooler, and the part of the cooler through which this cooling air flows form the secondary cooling circuit.

The liquid pipe 7, the cooler 10 and the cooling and cooling return pipes 11 and 12 are filled with coolant and the tank 5 is partly filled with coolant. This coolant can also act as a lubricant for the compressor element 2.

Figure 2:
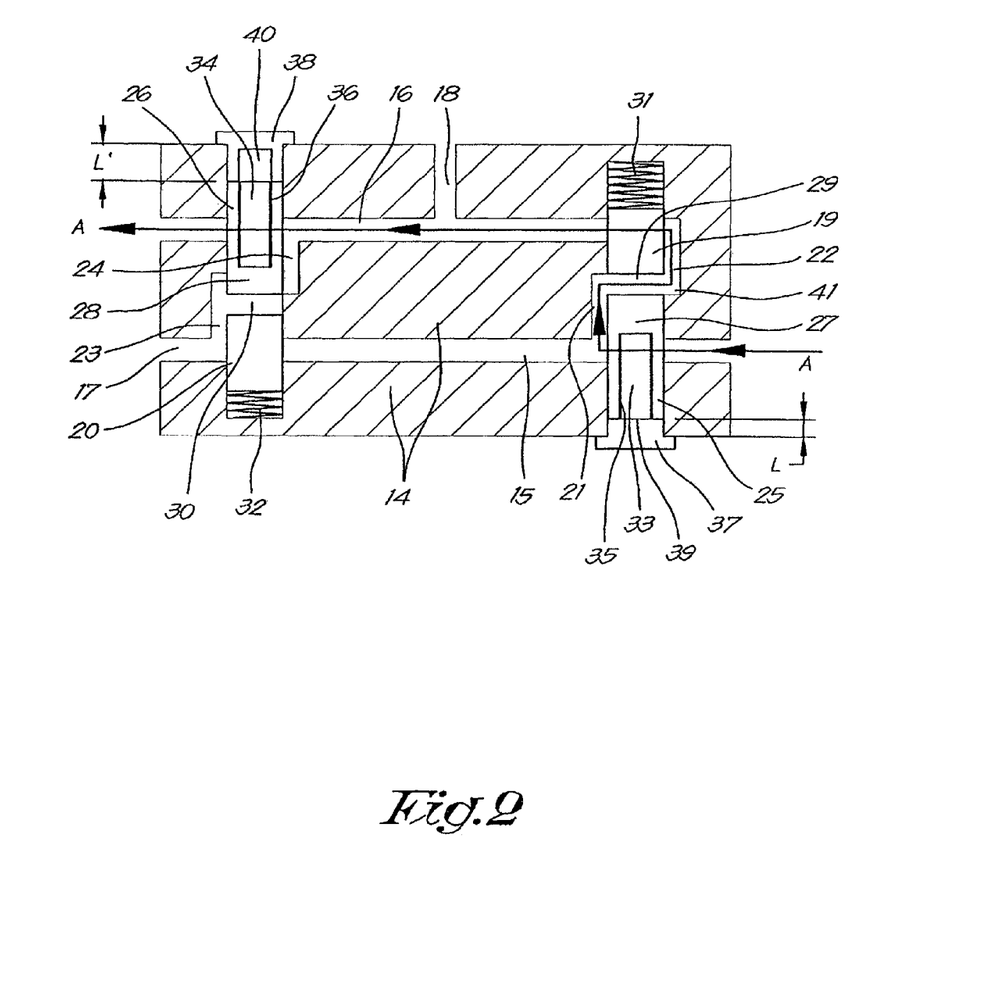
FIG. 2 shows the part indicated by F2 in FIG. 1 on a larger scale.

The thermostat block 9, as shown in more detail in FIG. 2, comprises a housing 14 with an inlet channel 15 and an outlet channel 16 in it that are each connected to the liquid pipe 7. Furthermore the thermostat block 9 comprises a cooling outlet 17 connected to the cooling pipe 11 and a cooling inlet 18 connected to the cooling return pipe 12.

The housing 14 is formed such that it comprises at least two chambers 19 and 20, as well as channel parts 21, 22, 23 and 24. Chamber 19 and channel parts 21 and 22 form part of a first thermostatic shut-off valve 25. Chamber 20 and channel parts 23 and 24 form part of a second thermostatic shut-off valve 26. The thermostatic shut-off valves 25 and 26 preferably have a common housing 14.

The thermostatic shut-off valves 25 and 26 further comprise a plunger 27, 28 respectively, with a passage 29, 30 respectively, and these plungers 27 and 28 can be moved axially in an aforementioned chamber 19, 20 respectively, and have two end positions, a spring 31, 32 respectively, that pushes against a respective plunger 27 and 28 and a sensor element 33, 34 respectively, that fits in a cavity 35, 36 respectively, in the plunger 27, 28 respectively. The sensor elements 33 and 34 essentially consist of wax or another substance that expands upon a temperature increase.

The chambers 19 and 20 are each closed by a cap 37, 38 respectively. One of the caps is an activating cap 37 that has a length L whereby the cap forms an end stop 39 for the first sensor element 33. The other cap is a deactivating cap 38 and has a length L' that is greater than L, and which is such that the plunger 28 remains in its end position with the spring 32 compressed irrespective of the temperature occurring, and thus the position of the sensor element in the plunger 28. In order to enable free expansion of the sensor element without affecting the position of the plunger, this deactivating cap 38 is provided with an expansion cavity 40.

The operation of the compressor device 1 is simple and as follows.

When the compressor element 2 is operating, a gas or mixture of gases, such as air, is drawn in through the gas inlet 3 and blown out under a higher pressure via the gas outlet 4. In the compressed gas there is a significant quantity of coolant, for example oil, because coolant to cool and lubricate is injected into the compressor element 2 via the coolant inlet 8.

The gas/coolant mixture goes into the gas/coolant separation tank 5 under pressure where the gas and the coolant are separated from one another.

Compressed gas can be taken by the user from this separation tank 5 via a compressed gas tap-off point 6. The separated coolant goes to the bottom of the tank 5 and flows under the effect of the pressure difference between the tank 5 and the coolant inlet 8 via a liquid pipe 7 and the thermostat block 9 to the coolant inlet 8 from where the coolant is injected into the compressor element 2.

Hereby the coolant follows the path of least resistance, which varies according to the operating conditions either only via the connecting channel 41 through the thermostat block 9 or thus directly to the coolant inlet 8, or only through the cooler 10 or thus indirectly, or partly via both.

As a result a closed cooling circuit comes into being, in which the flow direction of the coolant is shown in FIG. 1 by means of arrows.

By calculating the expected condensation temperature, whereby in particular the temperature and humidity of the gas to be compressed and the operating pressure are important, a selection is made of the target parameter against which the temperature of the coolant must be controlled, and thereby the way in which the temperature of the coolant is controlled. This decision is normally made by reading off which target parameter must be selected in a pre-prepared decision table or diagram.

Figure 7:
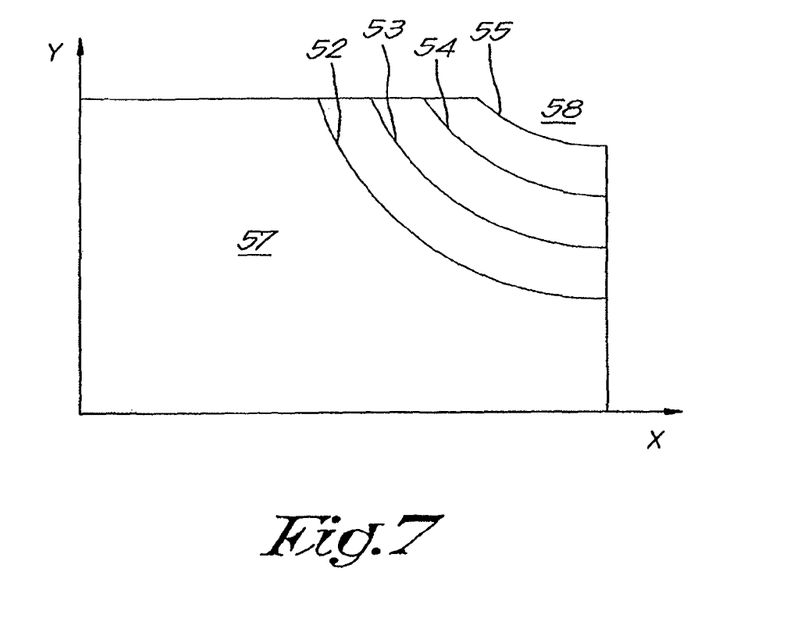
FIGS. 7 and 8 show examples of decision diagrams that are used together with the compressor device.
Figure 8:
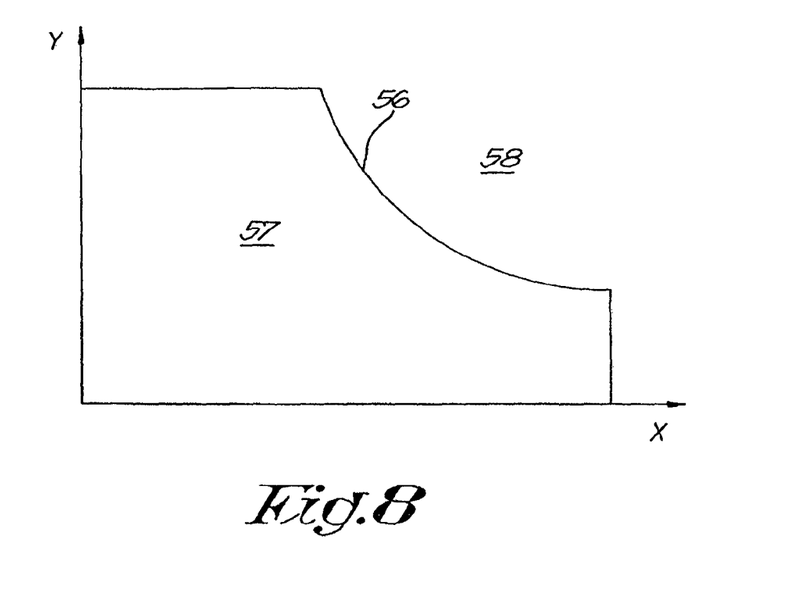

Examples of such diagrams are given in FIGS. 7 and 8.

In these diagrams the temperature of the incoming air, going from the lowest to the highest design limit of the compressor device, is plotted against the horizontal axis, marked by X. In FIG. 7 the relative humidity of the incoming air, going from 0 to 100%, is plotted against the vertical axis, marked by Y, and in FIG. 8 the operating pressure of the compressor device, going from the lowest to the highest design pressure.

Lines 52, 53, 54, 55, 56 form boundaries between the regions 57 and 58, whereby region 57 indicates that the target parameter to be activated is the temperature of the coolant at the inlet 8, and region 58 indicates that the target parameter to be activated is the temperature of the coolant entering the cooler 10.

Lines 52, 53, 54 and 55 indicate the dividing lines for different operating pressures of the compressor device, whereby the operating pressures drop in the order 52, 53, 54, 55.

This selection can be done now and again, for example twice per year, to distinguish between a summer and winter setting, or very often, whereby current measured parameters determine the selection a number of times per minute, or at all frequencies in between them, whereby depending on the specific embodiment the difficulty of changing the selection has to be weighed up against the benefit of a change.

If the choice is for the cooler inlet temperature as the target parameter, for example to prepare for the summer period in which high gas inlet temperatures and humidities must be taken into account, and thus a high condensation temperature can be expected, and/or to prepare for a period in which a high operating pressure will be set, this selection is implemented by closing chamber 19 of the first thermostatic shut-off valve 25 with the activating cap 37 and thereby activating this first thermostatic shut-off valve 25. The deactivating cap 38 is used to close chamber 20 of the second thermostatic shut-off valve 26 and thereby to deactivate this second thermostatic shut-off valve 26.

The critical temperature of the thermostat of the activated thermostatic shut-off valve 25, i.e. the temperature at which the wax element has reached its maximum expansion, is determined on the basis of the above-mentioned high condensation temperature, which in turn is a function of the maximum allowed temperature and humidity of the intake gas and the maximum possible operating pressure, and is 95° C. for example. However, if the compressor is used in an application where the maximum allowed temperature of the compressor and/or humidity of the intake gas will never be reached, and/or where the operating pressure will always be less than the maximum allowed operating pressure, the maximum possible condensation temperature for this specific application can be calculated, and the critical temperature of the first thermostatic shut-off valve 25 is adjusted to this. If during certain periods the compressor will operate within highly divergent maximum occurring temperatures and humidities of the intake gas and/or operating pressures, and whenever one of these parameters is below the maximum allowed values of the compressor, this adjustment can also be done periodically. In this way a number of thermostatic shut-off valves 25 with different critical temperatures can be available (for example 80° C., 85° C., 90° C., 95° C.) and the thermostatic shut-off valve 25 with the right critical temperature can be periodically installed.

The placement of the deactivating cap 38 in chamber 20 results in the plunger 28 being pushed to its closed end position, so that the passage 30 does not form a link between the channel parts 23 and 24. The spring 32 is hereby tensioned. Upon expansion of the thermostatic sensor element as a result of a high temperature, this second sensor element 34 has the expansion cavity 40 available to be able to freely expand in it, without affecting the position of the plunger 28.

When using the compressor device 1, the coolant, such as oil, will heat up. Before this has reached the critical temperature of the first thermostatic shut-off valve 25, for example 95° C., the first sensor element 33 is not or only slightly expanded, whereby the plunger 27 is in its open end position, in which the passage 29 connects the channel parts 21 and 22 together, and together with these channel parts 21 and 22 forms a connecting channel 41.

Because the coolant experiences a flow resistance in both the cooler 10 and in the connecting channel 41, this coolant will partly flow via the cooler 10 and partly through the connecting channel 41 from the inlet channel 15 to the outlet channel 16, and from there to the coolant inlet 8 via the liquid pipe 7, whereby for clarity it should be mentioned that the coolant can flow in the outlet channel 16 around the plunger 26. It must be noted here that in a well-designed system, the flow resistance through the cooling and cooling return pipes 11 and 12, and the cooler 10, is higher than through the connecting channel 41, so that the coolant primarily flows through connecting channel 41. This last route is indicated with arrow A in FIG. 2.

When the critical temperature is exceeded, the first sensor element 33 is expanded such that it pushes the plunger 27 to a closed end position with the end stop 39 as a surface against which the force is exerted on the other side, such that the plunger 27 forms a shut-off between the channel parts 21 and 22. The connecting channel 41 is hereby closed.

Figure 3:
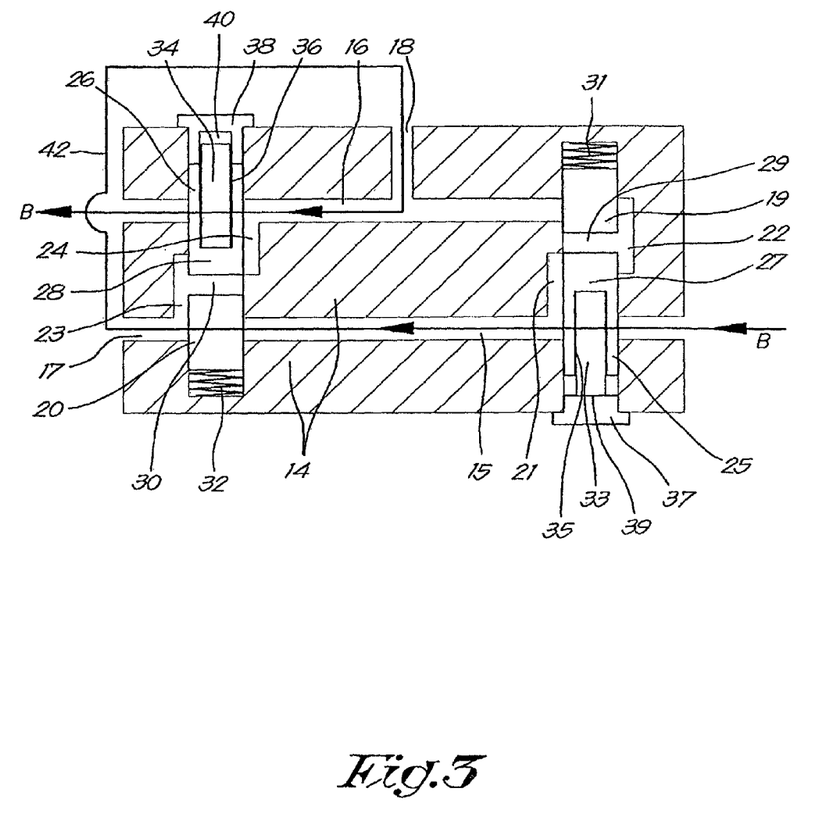
FIGS. 3 to 5 show a similar view as in FIG. 2, but in different situations that can occur during the use of the compressor device.

As a result of this the coolant will flow completely through the cooling pipe 11, the cooler 10 and the cooling return pipe 12, from the inlet channel 15 to the outlet channel 16, and from there to the coolant inlet 8 via the liquid pipe 7, as indicated by arrow B in FIG. 3. The coolant in the inlet channel 15 can flow around the plunger 25.

The link between the inlet channel 15 and the outlet channel 16 via the cooling pipe 11, the cooler 10 and the cooling return pipe 12 can also be considered as an external connecting channel 42.

Because the coolant has flowed along the cooler 10, it is cooled down. In practice an equilibrium is established in which the plunger 27 is between its two end positions and the passage 29 links the channel parts 21 and 22 together but also forms a variable restriction, so that the coolant flows partly through the connecting channel 41 and partly through the external connecting channel 42 from the inlet channel 15 to the outlet channel 16, whereby the distribution is determined by the position of the plunger 27, such that the oil temperature at the inlet of the cooler 10, which is practically equal to the temperature of the tank 5, will be set at the critical temperature.

If the actual or expected operating conditions are such that the expected condensation temperature is limited, for example due, to a low operating pressure, a low inlet temperature or low humidity, the selected target parameter of the temperature control can be the oil temperature at the coolant inlet 8, or the practically identical mixed temperature of the oil flows through the cooler 10 and one of the internal connecting channels 41, 43.

Figure 4:
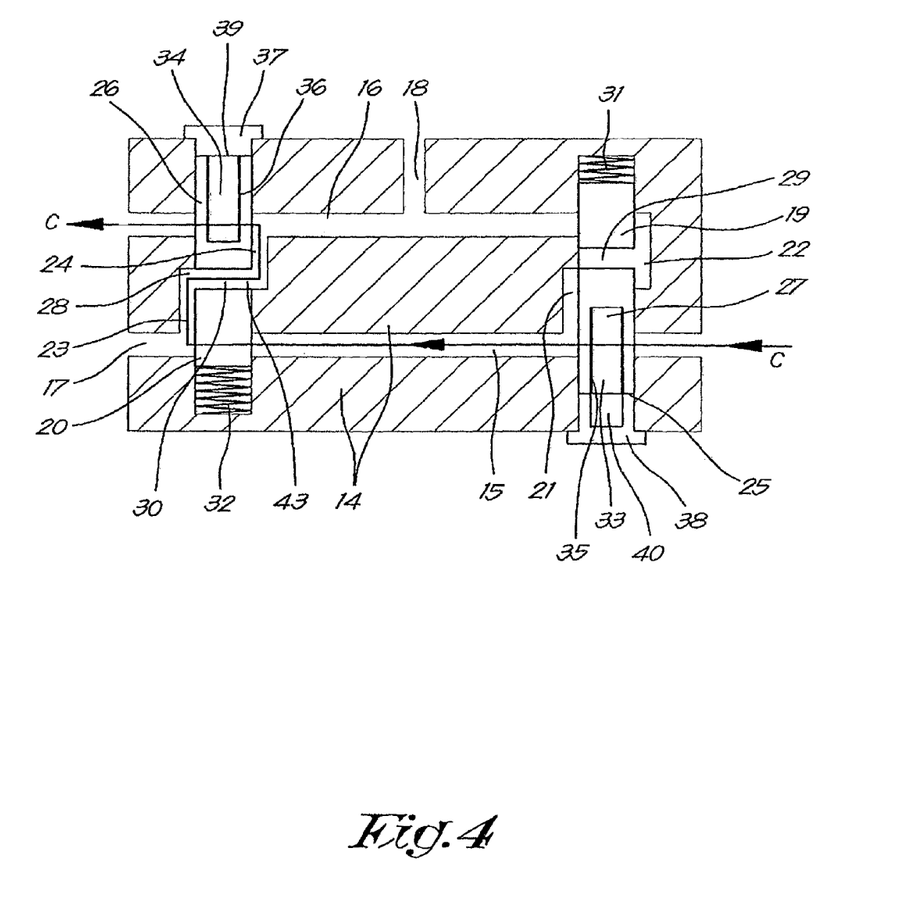

This selection is implemented by closing chamber 19 of the first thermostatic shut-off valve 25 with the deactivating cap 38, and thereby deactivating this first thermostatic shut-off valve 25. The activating cap 37 is used to shut-off chamber 20 of the second thermostatic shut-off valve 26 and thereby activating the second thermostatic shut-off valve 26, as shown in FIG. 4.

The critical temperature of this second thermostatic shut-off valve, i.e. the temperature at which the wax element has reached its maximum expansion, is chosen such that the compressor installation operates in the most energy-efficient manner, and is 50° C. for example.

The placing of the deactivating cap 38 in chamber 19 has an analogous consequence for the first thermostatic shut-off valve 25 as described above for the second thermostatic shut-off valve 26 and its components when this deactivating cap 38 is placed in chamber 20.

When using the compressor device 1 the coolant will heat up. When the coolant in the inlet channel flows, it will flow past the first thermostatic shut-off valve 25, whereby the connecting channel 41 is in the closed position because this thermostatic shut-off valve 25 has been deactivated.

Before the critical mixed temperature of the second thermostatic shut-off valve 26 is reached in the outlet channel, for example 50° C., the second sensor element 34 is not or only slightly expanded, such that the plunger 28 is in an open position in which the passage 30 links the channel parts 23 and 24 together, and forms a connecting channel 43 together with these channel parts 23 and 24.

Because the coolant experiences a flow resistance in both the cooler 10, thus in the external connecting channel 42, and in the connecting channel 43, this coolant will flow partly through the cooler 10 and partly through the connecting channel 43 from the inlet channel 15 to the outlet channel 16, and from there to the coolant inlet 8 via the liquid pipe 7. It should be noted here that in a well-designed system the flow resistance through the cooling pipe and cooling return pipes 11 and 12, and the cooler 10, is higher than via the connecting channel 43, so that the coolant primarily flows via connecting channel 43. This last route is indicated with arrow C in FIG. 4.

Channel part 24, which comprises the outlet of connecting channel 43, is upstream from the second sensor element 34. The cooling return pipe 12 is upstream from the second sensor element 34.

When the critical temperature is exceeded, the second sensor element 34 is expanded such that the plunger 28 is pushed in a second end position with the end stop 39 as the surface against which the force is exerted on the other side, such that the plunger 28 forms a shut-off between the channel parts 23 and 24. The connecting channel 43 is thus closed.

As a result of this the coolant will flow through the aforementioned external connecting channel 42 from the inlet channel 15 to the outlet channel 16. From the outlet channel 16 the coolant flows to the coolant inlet 8 via the liquid pipe 7. This route is indicated by arrow D in FIG. 5.

Figure 5:
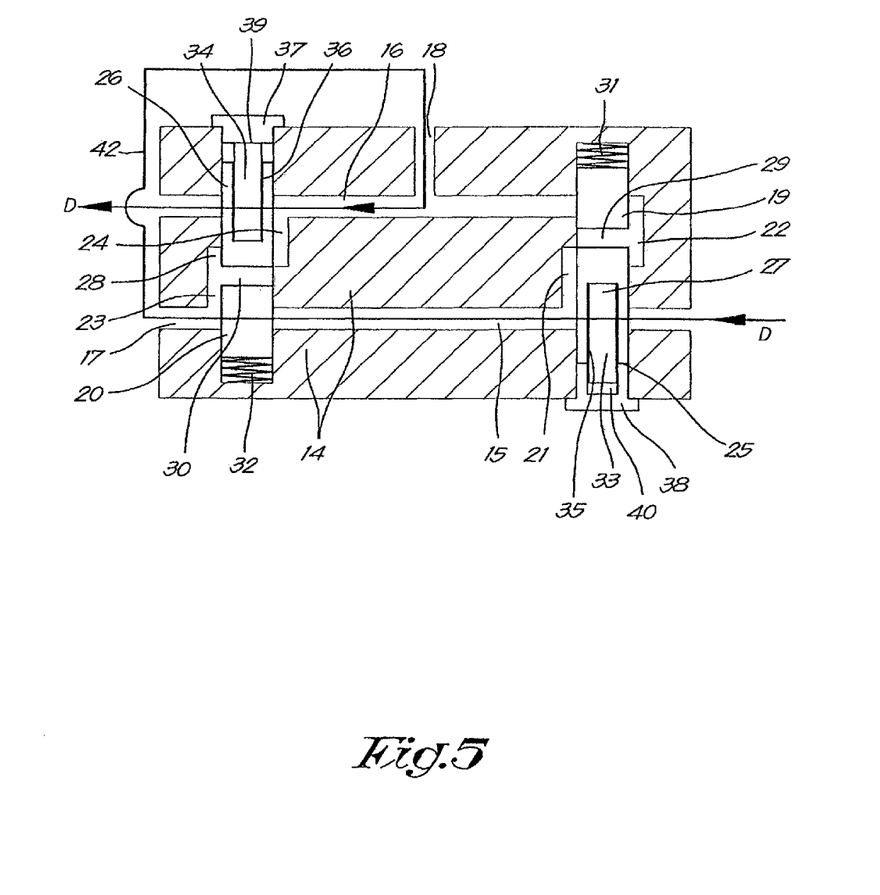

Because this coolant has flowed along the cooler 10, it is cooled. In practice an equilibrium arises in which the plunger 28 is between its two ends and the passage 30 links the channel parts 23 and 24 together, but also forms a variable restriction, such that the coolant flows partly via the connecting channel 43 and partly via the external connecting channel 42 from the inlet channel 15 to the outlet channel 16, whereby the distribution is determined by the position of the plunger 28, so that the temperature of the coolant mixture, which has flowed partly through the cooler 10 and partly through the connecting channel 43, will beset to the critical temperature.

In this embodiment the connecting channels 41 and 43 form two options for a bypass of the cooler 10.

Optionally one or more oil filters can be integrated in the thermostat block 9.

Errors and are avoided by using two different caps 37 and 38.

Figure 6:
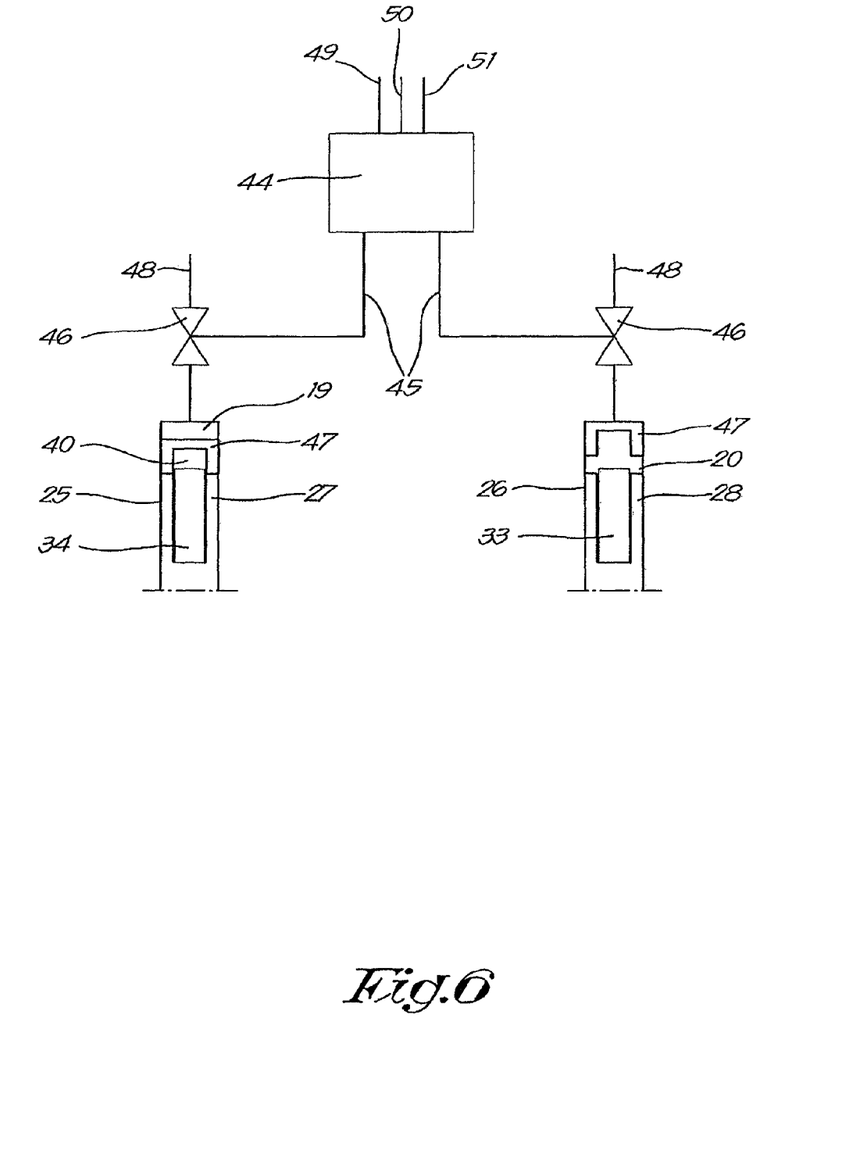
FIG. 6 shows a view according to FIG. 2 of a variant of a compressor device according to the invention.

In the example shown a control means is selected by placing the caps 37 and 38. This selection can also be done automatically, as shown in FIG. 6.

A data processing unit 44 is provided here that is connected via two control lines 45 to two magnetic valves 46, i.e. one magnetic valve on each thermostatic shut-off valve 25 and 26. Instead of the caps 37 and 38, activation elements 47 are provided that can move in the longitudinal direction of a chamber 19 or 20 respectively. The valves 46 can each switch between a first position in which a compressed air pipe 48 is connected to the chamber 19 or 20 concerned, and a position in which this chamber 19 or 20 is connected to the atmosphere.

The data processing unit is equipped with connections 49, 50 and additionally but not necessarily 51, to measuring instruments for respectively determining the operating pressure of the compressor device 1, i.e. the pressure of the compressed gas in the gas/coolant separation tank 5, the temperature of the gas drawn in by the compressor element 2, and additionally but not necessarily the humidity of this intake gas.

The operation of this is simple and as follows. The data processing unit 44 processes the measured data that it receives via a decision algorithm from which a decision follows regarding the thermostatic shut-off valve 25 or 26 to be activated.

Depending on this, one of the valves 46 is placed in a position whereby compressed air pushes the accompanying activation element 47 against the plunger 27 or 28 and thereby deactivates the accompanying shut-off valve 25 and 26. The other valve 46 is placed in a position such that the chamber 19 or 20 has an open connection to the atmosphere, whereby the activation element 47 can freely move in this chamber 19 or 20 and the accompanying thermostatic shut-off valve 25 or 26 is activated.

An oil injection point can also be integrated in the thermostat block 9, as is known from BE 1.018.075 and/or a facility as known from BE 1.016.814, in order to temporarily open a bypass in the event load changes. In the last case a supplementary connecting channel can thereby be integrated in the thermostat block 9 between the inlet channel 15 and the outlet channel 16.

The present invention is by no means limited to the embodiments described as an example and shown in the drawings, but a compressor device according to the invention can be realised in all kinds of variants, without departing from the scope of the invention.

The invention claimed is:

1. A compressor device that comprises:
   a liquid-injected compressor element that is equipped with a compression chamber with at least one coolant inlet, and which furthermore comprises a gas outlet,
   a gas/coolant separation tank connected to the gas outlet, and
   a cooling circuit equipped with a cooler that extends between the separation tank and the at least one coolant inlet of the compression chamber, and which is equipped with control means to adjust a temperature of a coolant flow supplied to the compressor element,
   wherein the aforementioned control means comprise a first and a second sub-controller, each with a different target parameter based on a first operating condition and a second operating condition,
   wherein the aforementioned control means also comprise switching means to place only one of the two sub-controllers in an activated state and only the other of the two sub-controllers in a deactivated state based on a selected target parameter during the first operating condition and place the deactivated sub-controller in the activated state and the other of the two sub-controllers in the deactivated state during the second operating condition to control the coolant flow through the cooling circuit and the cooler,
   wherein the aforementioned first sub-controller comprises a first shut-off valve and a first connecting channel configured to allow the coolant flow to flow through the first shut-off valve,
   wherein the aforementioned second sub-controller comprises a second shut-off valve and a second connecting channel configured to allow the coolant flow to flow through the second shut-off valve, and
   wherein the aforementioned first and second shut-off valves are equipped with a common housing, and
   wherein in the deactivated sub-controller, the respective first or second connecting channel through the deactivated sub-controller is closed off so that a link of the coolant flow through the deactivated sub-controller is not formed and the respective first or second shut-off valve does not affect an opening or closing of the respective first or second connecting channel of the deactivated sub-controller, and
   wherein the control means is configured in a way such that the coolant flow always entirely or partially flows over sensor elements of both the first sub-controller and the second sub-controller independently of the state of the first sub-controller and the second sub-controller.

2. The compressor device according to claim 1, wherein the aforementioned first sub-controller is constructed in the form of a controller of the temperature of the coolant at an inlet of the cooler or a temperature equal to it.

3. The compressor device according to claim 1, wherein the aforementioned second sub-controller is constructed in the form of a controller of the temperature of the coolant at the at least one coolant inlet of the compressor element or a temperature equal to it.

4. The compressor device according to claim 1, further comprising a bypass across the cooler and that the first and/or second sub-controller is constructed such that it is configured to adjust the temperature of the coolant at the inlet of the cooler or at the at least one coolant inlet or temperatures equal to it by adjusting the ratio of the respective coolant flow rates through the cooler and through the bypass.

5. The compressor device according to claim 2, wherein the aforementioned first and/or second sub-controller is constructed such that it is configured to adjust the temperature of the coolant at the inlet of the cooler or at the at least one coolant inlet or temperatures equal to it by adjusting the flow or temperature in a secondary circuit of the cooler.

6. The compressor device according to claim 1, wherein said first shut-off valve is a thermostatic shut-off valve.

7. The compressor device according to claim 1, wherein said second shut-off valve is a thermostatic shut-off valve.

8. The compressor, device according to claim 6, wherein said second shut-off valve is a thermostatic shut-off valve, and wherein dimensions of the chamber of both the first and second shut-off valves are the same.

9. The compressor device according to claim 1, wherein the aforementioned common housing comprises an inlet channel and an outlet channel, connected by three connecting channels, the first and second of which are able to be closed off, whereby the first thermostatic shut-off valve with a first sensor element that is thermally connected to the inlet channel is configured to reversibly shut off the first connecting channel when a reference value of the temperature in the inlet channel is exceeded, whereby a second thermostatic shut-off valve with a second sensor element that is thermally connected to the outlet channel is configured to reversibly shut off the second connecting channel when a reference value of the temperature in the outlet channel is exceeded, and whereby the link formed by the third connecting channel runs via the cooler.

10. The compressor device according to claim 9 that the first and second connecting channel run internally in the housing and the third connecting channel runs externally to the housing.

11. The compressor device according to claim 9, wherein the thermostatic shut-off valves each comprise a plunger with a passage, and this plunger is configured to be moved between at least two positions of a first position whereby the passage does not form a connection between the inlet channel and the outlet channel and a second position in which the passage forms part of the first or second connecting channel.

12. The compressor device according to claim 11, wherein the sensor element of each of the thermostatic shut-off valves expands upon a temperature increase, and this sensor element is in contact with the plunger and the plunger is configured to move between the aforementioned positions, and each comprise a spring that opposes a force exerted by the sensor element, whereby the switching means consists of a blocking means that is configured to block a plunger in its first position, and a means that forms an end stop for the sensor element of the other plunger.

13. The compressor device according to claim 9, wherein the sensor element of each thermostatic shut-off valve is affixed in a chamber with an opening whereby the dimensions of the chambers of both thermostatic shut-off valves are the same, and whereby the aforementioned switching means comprise a deactivating cap that has a length that corresponds to a blocked position of the plunger and is provided with a recess that enables the free expansion of the sensor element, and an activating cap that has a length such that, the activating cap forms an end stop for the sensor element.

14. The compressor device according to claim 1, wherein the aforementioned switching means comprise a data processing unit that is connected to measuring instruments for receiving measurement signals from them; and that a selection algorithm is programmed in the aforementioned data processing unit that determines an outcome on the basis of the aforementioned measurement signals that is converted into a control signal for the automatic activation of one of the sub-controllers.

15. The compressor device according to claim 14, wherein the first and second sub-controllers comprise magnetically controlled valves that are configured to respond to the control signal.

16. A method for controlling a compressor device that is equipped with a liquid-injected compressor element provided with a compression chamber with one or more coolant inlets, a gas/coolant separation tank connected to an outlet of the compressor element, and a pipe equipped with a cooler, for supplying a flow of coolant between the tank and the one or more coolant inlets, wherein this method comprises:

a selection step in which one of two or more sub-controllers that operate independently of each other and which act on a fixed but different target parameter is activated, wherein only one of the two or more sub-controllers is activated on the basis of a first or a second operating condition in order to adjust a temperature of the coolant at the one or more coolant inlets of the compressor element and only the other of the two or more sub-controllers is deactivated during the first and second operating condition to control the flow of the coolant through the pipe and the cooler based on the different target parameter, wherein a first sub-controller of the two or more sub-controllers comprises a first thermostatic shut-off valve and a first connecting channel configured to allow the coolant flow to flow through the first thermostatic shut-off valve, wherein a second sub-controller of the two or more sub-controllers comprises a second thermostatic shut-off valve and a second connecting channel configured to allow the coolant flow to flow through the second thermostatic shut-off valve, and wherein the aforementioned first and second thermostatic shut-off valves are equipped with a common housing, and closing off the respective first or second connecting channel in the deactivated sub-controller so that a link of the coolant flow through the deactivated sub-controller is not formed so that the respective first or second thermostatic shut-off valve does not affect an opening or closing of the respective first or second connecting channel of the deactivated sub-controller, and always entirely or partially flowing the coolant over sensor elements of the two or more sub-controllers independently of an activation state of the respective sub-controller.

17. The method according to claim 16, wherein the selection step is done on the basis of at least one of the temperature and a humidity of the gas drawn in by the compressor element and an operating pressure of the compressor device.

18. The method according to a claim 16, wherein the reference value of the first sub-controller is determined on the basis of at least one of a maximum possible temperature and a humidity of the intake gas and a maximum possible operating pressure.

19. The method according to a claim 16, wherein the reference temperature of the first sub-controller is determined on the basis of maximum occurring temperatures and humidities of the intake gas and/or operating pressures within a period, whenever one of these parameters lies below the maximum allowed values of the compressor device, so that for each part-period with an anomalous operation the first sub-controller is able to be set to a right reference temperature.

20. The method according to claim 16, wherein at least one of the two or more sub-controllers is activated manually.

21. The method according to claim 16, wherein the sub-controller is activated with an activating cap and that the other sub-controllers are provided with a deactivating cap.

22. The method according to claim 16, wherein a decision table or diagram is used to determine which sub-controller has to be activated and consequently which has to be deactivated.

23. The method according to claim 16, wherein an automatic selection and activation of the sub-controller is done with magnetic valves that are controlled by a control unit.

24. The method according to claim 16, wherein the control unit that does an automatic selection of the sub-controllers does so on the basis of at least one of a measured temperature and a humidity of the intake gas and an operating pressure of the compressor device.

25. The method according to claim 16, wherein the selection step and the activation of one of the two or more sub-controllers is done automatically.

* * * * *